(12) United States Patent
Magnier

(10) Patent No.: US 9,939,244 B2
(45) Date of Patent: Apr. 10, 2018

(54) MOLDED PART AND ITS MANUFACTURING METHOD

(71) Applicant: Faurecia Interieur Industrie, Nanterre (FR)

(72) Inventor: David Magnier, Anserville (FR)

(73) Assignee: Faurecia Interieur Industrie, Nanterre (FR)

( * ) Notice: Subject to any disclaimer, the term of this patent is extended or adjusted under 35 U.S.C. 154(b) by 161 days.

(21) Appl. No.: 14/834,604

(22) Filed: Aug. 25, 2015

(65) Prior Publication Data

US 2016/0061575 A1 Mar. 3, 2016

(30) Foreign Application Priority Data

Aug. 26, 2014 (FR) ...................... 14 57992

(51) Int. Cl.
| | |
|---|---|
| *G01B 3/20* | (2006.01) |
| *B29C 37/00* | (2006.01) |
| *B29C 45/37* | (2006.01) |
| *B29C 33/42* | (2006.01) |
| *G01B 5/14* | (2006.01) |
| *B29C 45/00* | (2006.01) |

(52) U.S. Cl.
CPC .............. *G01B 3/20* (2013.01); *B29C 33/42* (2013.01); *B29C 37/005* (2013.01); *B29C 45/37* (2013.01); *B29C 45/0025* (2013.01); *G01B 5/14* (2013.01)

(58) Field of Classification Search
CPC .................................. G01B 3/20; G01B 5/14
USPC .................. 33/809, 810, 832, 833, 506, 783
See application file for complete search history.

(56) References Cited

U.S. PATENT DOCUMENTS

| | | | |
|---|---|---|---|
| 4,485,217 A | 11/1984 | Gunter et al. | |
| 4,539,755 A * | 9/1985 | Weimer | G01B 5/14 33/655 |
| 4,719,808 A * | 1/1988 | Baumann | B29C 47/92 264/40.1 |
| 5,570,513 A * | 11/1996 | Peterson | G01B 3/20 33/506 |
| 8,087,181 B2 * | 1/2012 | Rogers | G01B 5/0032 33/611 |
| 9,316,470 B2 * | 4/2016 | Zhang | G01B 3/002 |
| 2004/0069077 A1 * | 4/2004 | King | G01B 5/205 33/555 |

(Continued)

FOREIGN PATENT DOCUMENTS

EP 0550185 A1 7/1993

OTHER PUBLICATIONS

French Search Report for corresponding application No. 1457992, dated Apr. 15, 2015, 2 pages.

*Primary Examiner* — Yaritza Guadalupe-McCall
(74) *Attorney, Agent, or Firm* — Reising Ethington P.C.

(57) ABSTRACT

A molded part made in plastic material that includes a body having a surface and two positioning relief portions formed on the surface while being spaced apart from each other along a measurement direction, each positioning relief portion having a positioning protrusion defining a measurement surface allowing the positioning of a sensor member of a distance measurement instrument along the measurement direction bearing against the measurement surface, in order to measure the distance between the positioning relief portions along the measurement direction.

11 Claims, 3 Drawing Sheets

(56) References Cited

U.S. PATENT DOCUMENTS

| | | | |
|---|---|---|---|
| 2008/0115379 A1* | 5/2008 | Park | B60J 10/00 33/613 |
| 2009/0064520 A1* | 3/2009 | Sherlock | F01D 25/285 33/562 |
| 2010/0186242 A1* | 7/2010 | Kipnes | G01B 7/284 33/199 R |
| 2012/0030957 A1* | 2/2012 | Kipnes | G01B 3/20 33/701 |
| 2012/0124853 A1* | 5/2012 | Petersheim | G01B 5/14 33/833 |
| 2013/0042490 A1* | 2/2013 | Walker | G01B 5/08 33/201 |
| 2013/0269199 A1* | 10/2013 | Biselx | G01B 3/002 33/810 |
| 2015/0276366 A1* | 10/2015 | Emtman | G01B 3/205 33/701 |
| 2015/0316365 A1* | 11/2015 | Emtman | G01B 3/008 33/701 |
| 2016/0061575 A1* | 3/2016 | Magnier | G01B 3/20 33/810 |

* cited by examiner

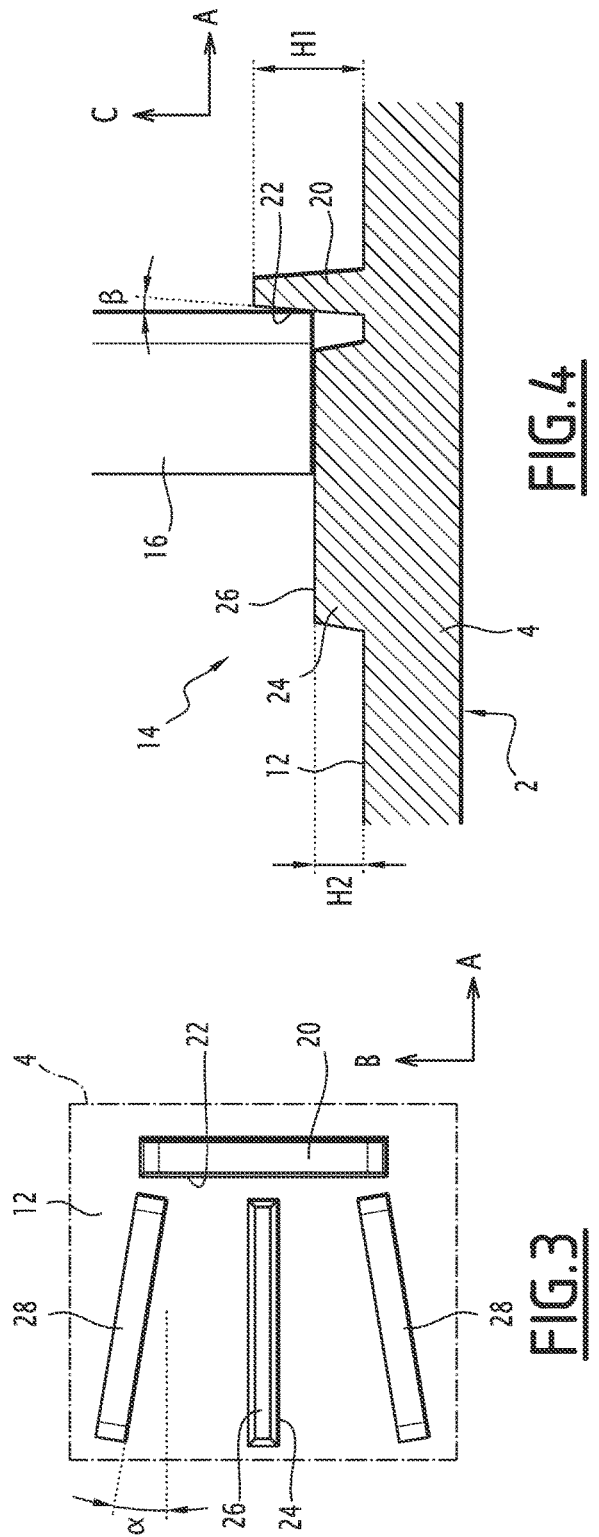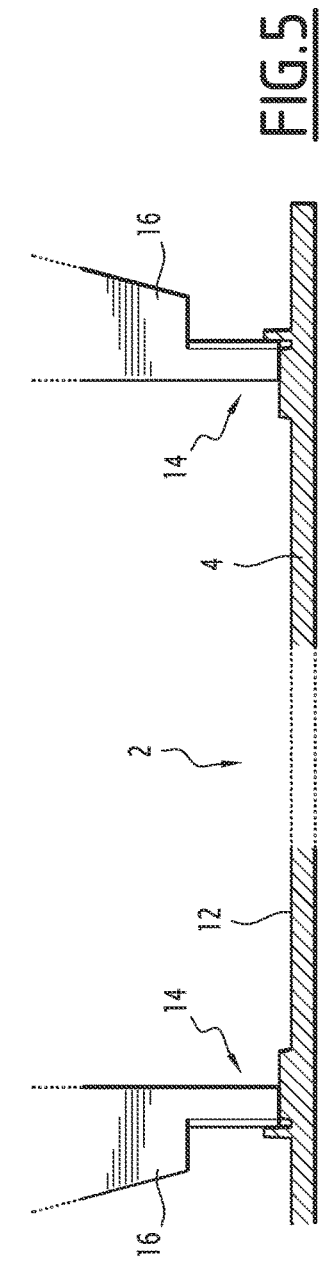

MOLDED PART AND ITS MANUFACTURING METHOD

TECHNICAL FIELD

The present invention relates the field of manufacturing molded parts in plastic material.

BACKGROUND

For producing a molded part in plastic material, heated plastic material in a liquid or viscous state, is introduced into a mold so as to assume the shape of the mold, and the plastic material then cools and solidifies. It thus retains the shape which was given to it in the mold.

During the cooling of the molded part, it is possible that shrinkage of the plastic material occurs, i.e. a contraction of the molded part. The result of this may be that the molded part after cooling does not have the required dimensions. This shrinkage phenomenon is all the more sensitive since the plastic material part has great dimensions.

It is possible to dimension the mold according to the expected shrinkage so that the molded part after cooling has the required dimensions. Nevertheless the shrinkage of a molded part may also change over time depending on the molding parameters like pressure or temperature. This shrinkage is difficult to anticipate, which complicates the manufacturing of the molded part.

It is possible to use a metrological instrument specifically developed for the molded part and comprising a structure allowing the part to be received in a determined position and on which are mounted sensors for measuring predefined dimensions of the molded part repeatedly and accurately. Nevertheless, such instrument is expensive, cumbersome and time-consuming for application.

SUMMARY

One of the objects of the present invention is to propose a molded part in plastic material which facilitates manufacturing of the molded part.

For this purpose, the invention proposes a molded part in a plastic material, the molded part comprising a body having a surface and two positioning relief portions formed on the surface while being spaced apart from each other along a measurement direction, each positioning relief portion having a positioning protrusion defining a measurement surface giving the possibility of positioning a sensor member of a distance measurement instrument so as to press against the measurement surface along the measurement direction, in order to measure the distance between the positioning relief portions along the measurement direction.

In particular embodiments, the molded part comprises one or more of the following optional features:

the positioning protrusion is a rib extending on the surface perpendicularly to the measurement direction;

each positioning relief portion comprises a supporting protrusion, the apex of which defines a supporting surface giving the possibility of positioning the sensor member simultaneously bearing upon the measurement surface along the measurement direction and upon the supporting spam along a supporting direction perpendicular to the measurement direction;

the supporting protrusion is a rib extending over the surface of the part along the measurement direction;

the supporting protrusion has a height less than that of the positioning protrusion;

the positioning protrusion and the supporting protrusion are distant from each other;

each positioning relief portion comprises at least one guiding protrusion for limiting the displacement of a sensor member along a transverse direction perpendicular to the measurement direction;

each positioning relief portion comprises two guiding protrusions provided for receiving the sensor member between them and wherein the lateral guiding protrusions converge towards the positioning protrusion;

each guiding protrusion is formed with a rib;

each guiding protrusion is spaced apart from the positioning protrusion.

The invention also relates to a method for dimensionally controlling a molded part in plastic material, comprising the steps:

molding the part by forming a body and two positioning relief portions on a surface of the body, the positioning relief portions being spaced apart from each other along a measurement direction, each positioning relief portion defining a measurement surface; and measuring the distance between both positioning relief portions along the measurement direction by means of a measuring instrument comprising two sensor members, for example a vernier caliper comprising two measuring claws, by positioning each sensor member bearing, along the measurement direction, against the measurement surface of a respective positioning relief portion.

BRIEF DESCRIPTION OF THE DRAWINGS

The invention and its advantages will be better understood upon reading the description which follows, only given as an example and made with references to the appended drawings, wherein:

FIG. 3 is a top view of a positioning relief portion of the molded part;

FIG. 4 is a detailed view of the area IV of FIG. 2; and

FIG. 5 is a similar view to that of FIG. 2, illustrating an alternative.

DETAILED DESCRIPTION OF THE ILLUSTRATED EMBODIMENTS

Figure 1:
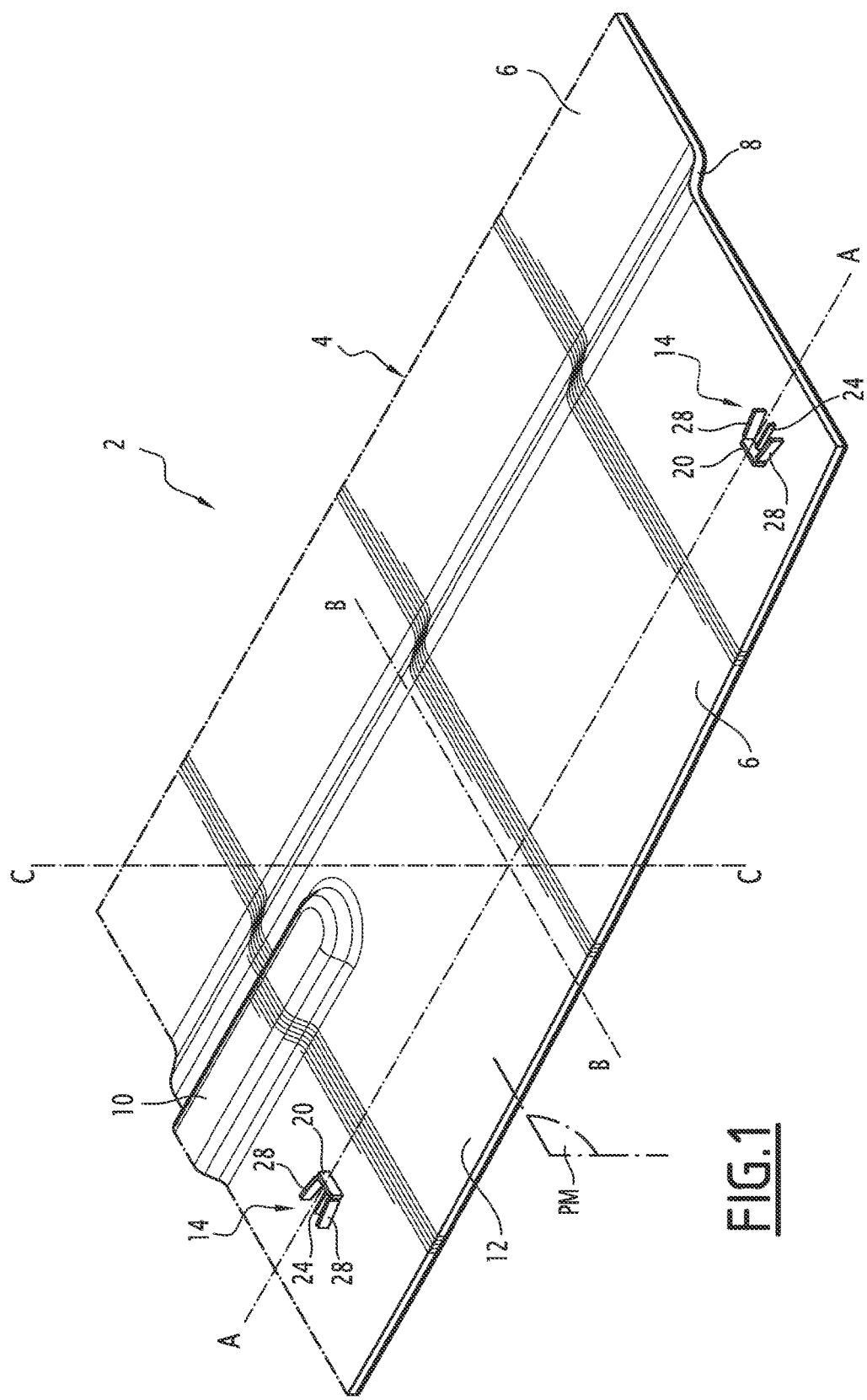
FIG. 1 is a schematic perspective view of a molded part in plastic material.

The molded part 2 in plastic material of FIG. 1 is for example from an automobile vehicle part, for example a part of a trim panel, notably a part of an interior trim panel.

The molded part 2 has a plate-shaped body 4. The plate-shaped body 4 is here formed in three dimensions. It comprises here two pads 6 connected through a discontinuity 8, one of the two pads being provided with a boss 10.

The body 4 has a surface 12 on which are molded two associated positioning relief portions 14, intended for positioning two sensor members 16 of a measuring tool with view to proceeding with dimensionally controlling the molded part 2. The surface 12 of the body 4 on which are positioned the two positioning relief portions 14 extends over one of these pads 6.

Both positioning relief portions 14 are spaced apart from each other along a measurement direction A. Both positioning relief portions 14 are each isolated on the surface 12 of the body 4. They are each just spaced apart from any other relief portion of the surface 12 of the body 4.

The surface 12 of the body 4 on which are positioned both positioning relief portions 14 extends along the measurement direction A and a transverse direction B perpendicular to the measurement direction A. The surface 12 is substantially planar. It extends along the plane defined by the measurement direction A and the transverse direction B.

Both positioning relief portions 14 are identical while being positioned on the surface symmetrically with respect to a median plane PM perpendicular to the measurement direction A and equidistant from both positioning relief portions 14.

Figure 2:
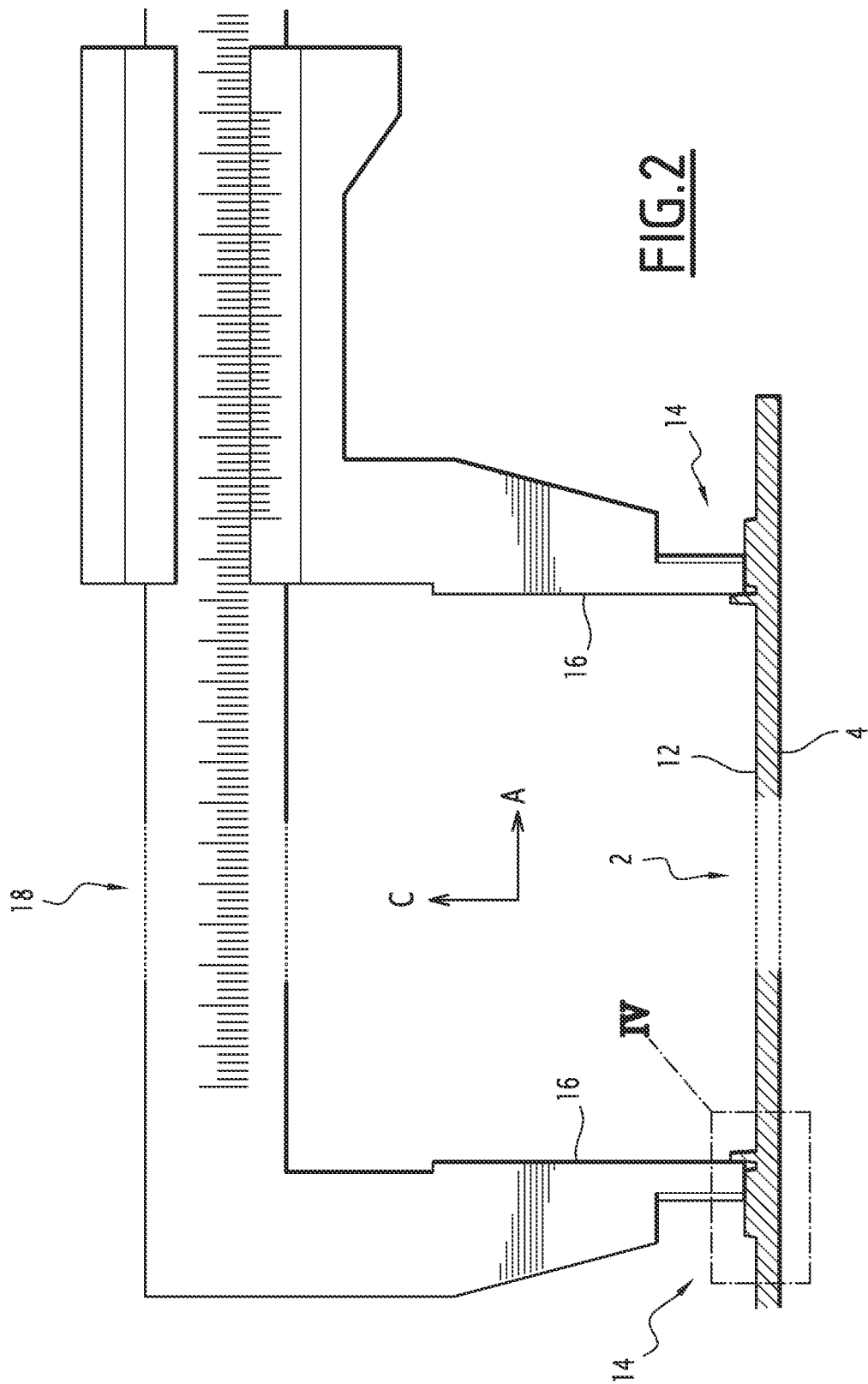
FIG. 2 is a schematic sectional view of the molded part and of the measuring instrument.

As illustrated in the FIG. 2, each positioning relief portion 14 is intended to be used as a support for a respective sensor member 16 of a distance measurement instrument 18, so as to measure the distance between both positioning relief portions 14 reliably and repeatedly.

The distance measurement instrument is preferably a manual measurement instrument. The distance measurement instrument is here a vernier caliper comprising a slide, a fixed sensor claw fixedly mounted along the slide and a movable sensor claw is slidably mounted along the slide.

Each positioning relief portion 14 comprises molded protrusions on the surface 12 of the body 4, while being laid out for reliable and repeated positioning of a sensor member 16.

Each positioning relief portion 14 comprises a positioning protrusion 20, defining a measurement surface 22 intended to be used as a support for a sensor member 16 along the measurement direction.

The positioning protrusion 20 is an elongated rib extending over the surface 12 of the body 4 along the transverse direction B perpendicular to the measurement direction A. The measurement surface 22 is a side face of the positioning protrusion 20. The measurement surface 22 extends along the transverse direction B.

The positioning protrusions 20 of both positioning relief portions 14 extend parallel with each other. The distance between the measurement surfaces 22 of the positioning protrusions 20 of both associated positioning relief portions 14 corresponds to the distance to be measured for dimensionally controlling the molded part 2.

Each positioning relief portion 14 comprises a supporting protrusion 24, the apex of which defines a supporting surface 26 is so as to allow a sensor member 16 to be supported along a supporting direction C substantially perpendicular to the surface 12 of the body 4. The supporting direction C is perpendicular to the measurement direction A and to the transverse direction B.

The supporting protrusion 24 of each positioning relief portion 14 is located on the surface 12 of the body 4, with respect to the positioning protrusion 20, on the same side as the measurement surface 22 of the positioning protrusion 20.

The supporting protrusion 24 is an elongated rib which extends on the surface 12 of the body 4 along the measurement direction A. As seen from above, the supporting protrusion 24 and the positioning protrusion 20 form a "T". The supporting protrusion 24 and the positioning protrusion 20 are spaced apart from each other. The supporting protrusion 24 extends towards the positioning protrusion 20 while stopping before reaching the positioning protrusion 20.

As visible in FIG. 4, the supporting protrusion 24 has a height H2, taken between its base on the surface of the body 4 and its apex, which is strictly smaller than that H1 of the positioning protrusion 20. Thus the supporting surface 26 is located at a height H2 strictly smaller than the height H1 of the measurement surface 22. The sensor member 16 laid on the supporting surface 26 may therefore along the measurement axis A bear against the measurement surface 22.

The supporting protrusions 24 of both positioning relief portions 14 have the same height. The supporting surfaces 26 of both supporting protrusions 24 are coplanar. This ensures positioning of both sensor members 16 in a same reference plane for repeated and reliable measurement, even if both positioning relief portions 14 are located in regions of the surface of the body 4 which are not coplanar.

As visible in FIGS. 1 and 3, each positioning relief portion 14 comprises two guiding protrusions 28 for limiting the displacement of the sensor member 16 along the transverse direction B of the surface 12 of the body 4 when the sensor member 16 is placed bearing against the positioning protrusion 20 and, if necessary, against the supporting protrusion 24.

Each lateral guiding protrusion 28 of a positioning relief portion 14 is located on the surface of the body 4, relatively to the positioning protrusion 20, on the same side as the measurement surface 22.

Each lateral guiding protrusion 28 is here an elongated rib. As seen from above, both lateral guiding protrusions 28 form with the positioning protrusion 20 a "U", the branches of which are defined by the guiding protrusions 28 and the base is defined by the positioning protrusion 20.

Both guiding protrusions 28 converge towards each other towards the positioning protrusion 20. The ends of the guiding protrusions 28 away from the positioning protrusion 20 are more separated than the ends of the guiding protrusions 28 close to the positioning protrusion 20. This facilitates the insertion of the sensor member 16 between the guiding protrusions 28 between the more separated ends, and then its bearing against the measurement surface 22 on the side of the closer ends.

The distance between both guiding protrusions 28 taken as close as possible to the positioning protrusion 20 is very slightly greater than the width of the sensor member 16, so as to facilitate positioning and repeatability of the measuring process.

Each lateral guiding protrusion 28 forms with the measurement direction A, as seen from the top, an angle $\alpha$ comprised between 0° and 45°.

As illustrated in FIG. 3, the guiding protrusions 28 form the same angle with the measurement direction A. Alternatively, the guiding protrusions 28 form different respective angles with the measurement direction A. In a particular embodiment, as seen from the top, a guiding protrusion 28 is parallel to the measurement direction A (the angle $\alpha$ is equal to 0°) while the other guiding protrusion 28 is oblique relatively to the measurement direction (it forms a non-zero angle with the measurement direction A and with a perpendicular to the measurement direction A). This allows better guidance of the sensor member 16 during its sliding on the supporting protrusion 24 towards the positioning protrusion 20.

Each guiding protrusion 28 is spaced apart from the positioning protrusion 20. Each guiding protrusion 28 extends on the surface 12 of the body 4 towards the positioning protrusion 20 while being terminated before the positioning protrusion 20.

Both guiding protrusions 28 are positioned on the surface 12 of the body 4 on either side of the supporting protrusion 24. Each guiding protrusion 28 has a height, taken between its base bound to the surface of the body 4 and its apex, greater than that of the supporting protrusion 24. Thus, the transverse displacement of the sensor member 16 placed bearing upon the apex of the supporting protrusion 24 is delimited by the guiding protrusions 28.

As illustrated in FIG. 4, the measurement surface 22 is not strictly perpendicular to the measurement direction, nor to the supporting surface 26, because the positioning protrusion 20 has a draft angle β for allowing it to be removed from the mold, typically comprised between 0.5° and 10°. However, the combination of the supporting protrusion 24 and of the positioning protrusion 20 ensures accurate and repeatable positioning of the sensor member 16 against the positioning protrusion 20.

The height of the protrusions is advantageously comprised between 0.5 and 5 mm.

Preferably, the height H2 of the supporting protrusion 24 is greater than the radius of a connecting fillet, which is inevitable between the measurement surface 22 and the surface 12 of the body 4. This ensures that the sensor member 16 will properly enter, into contact with the measurement surface 22.

The height H2 of the supporting protrusion 24 is for example comprised between 0.5 and 4 mm. The height H1 of the positioning protrusion 20 is for example comprised between 1 mm and 5 mm, in particular between 2 and 5 mm. The difference between the height H1 of the positioning protrusion 20 and the height H2 of the supporting protrusion 24 is for example comprised between 0.5 and 4 mm. In a particular embodiment, the height H1 of the positioning protrusion 20 is about 3 mm and the height H2 of the supporting protrusion 24 is about 1 mm.

In every case, the height of the protrusions is limited in order to limit risks of shrinkage on the surface of the body, opposite to the surface 12 on which are formed the protrusions.

In the embodiment of FIGS. 1 and 2, the measurement surfaces 22 are oriented opposite to each other. The supporting protrusion 24 and the guiding protrusions 28 of each positioning relief portion 14 are located on the side of the positioning protrusion 20 of this positioning relief portion 14 opposite to the other positioning relief portion 14. The measurement is conducted with the positioning protrusions located between the sensor members 16. The measurement is a so-called "external" measurement.

In the embodiment of FIG. 5, the measurement surfaces 22 of the positioning protrusions are oriented towards each other and face each other. The supporting protrusion 24 and the lateral guiding protrusions 28 of each positioning relief portion 14 are located on the same side of the positioning protrusion 20 of this positioning relief portion 14 as the other positioning relief portion 14. The measurement is conducted by means of the sensor members 16 inserted between the positioning protrusions 20. The measurement is a so-called "internal" measurement.

The molded part 2 in plastic material is made in one piece. The positioning relief portions 14 are made by molding with the body 4. They are specifically made for carrying out dimensional control of the molded part 2 by measuring the distance between both positioning relief portions 14.

The positioning relief portions 14 formed with ribs give the possibility of easily obtaining the positioning relief portions 14, by limiting the volume of the positioning relief portions 14 and by notably limiting the risks of shrinkage. The spacing out of the protrusions further limits this risk by avoiding formation of thick junctions between the protrusions.

It is possible to provide several pairs of positioning relief portions on the molded part 2 in order to make the measurements along at least two measurement directions forming a non-zero angle between them. Indeed, depending on the shape and dimensions of the molded part 2 in plastic material, significant shrinkage of the molded part 2 along several directions may be observed, making it necessary to carry out dimensional controls along each of these directions.

A method for serial manufacturing of the molded part 2 in plastic material comprises the steps:

molding the part in a mold by forming a body 4 and two positioning relief portions 14 on a surface of the body 4, the positioning relief portions 14 being spaced apart from each other along a measurement direction, each positioning relief portion 14 having a positioning protrusion 20 defining a measurement surface 22; and measuring the distance between both positioning relief portions 14 along the measurement direction by means of a measuring instrument comprising two sensor members 16, for example a vernier caliper comprising two measurement claws, by positioning each sensor member 16 along the measurement direction so as to bear against the measurement surface 22 of a respective positioning relief portion 14.

The molding is achieved by injection or by compression. For injection molding, heated molten plastic material is injected into the closed mold, by means of injection conduits opening into the inside of the mold. For compression molding, an amount of heated molten plastic material or in a viscous condition is introduced into the open mold, and then the mold is closed.

The distance measurement is carried out after removing the mold and cooling down the molded part 2.

The distance measurement is carried out on a pre-series or series parts, so as to check whether a shrinkage of the molded part 2 in practice corresponds to the expected theoretical shrinkage, so that the part after cooling has the desired dimensions.

If the dimensional control is satisfactory, the molding parameters are very dated and it may be used for mass-production of molded parts. The molding parameters notably comprise the injection temperature and the injection pressure of the plastic material in the case of injection molding, and the molding temperature of the plastic material and the closing rate of the mold in the case of compression molding. If the dimensional control is not satisfactory, it is then necessary to modify the mold and/or the molding parameters and to repeat the procedure.

The positioning relief portions 14 specifically provided for the positioning, on a surface of a body 4 of the molded part 2, sensor members 16 such as claws of a vernier caliper give the possibility of conducting a reliable and repeatable manual measurement. It is then no longer necessary to proceed with dimensional control by means of complex measuring instruments which takes a long time and is expensive to apply.

The design and the development of the mold for molding the molded part 2 are therefore achieved more rapidly and more easily, making the manufacturing of the molded part 2 easier and less expensive.

The invention claimed is:

1. A molded part in plastic material, the molded part comprising a body having a surface and two positioning relief portions formed on the surface while being spaced apart from each other along a measurement direction, each positioning relief portion being integrally molded with the body and each positioning relief portion having a positioning protrusion defining a measurement surface allowing the positioning of a sensor member of a distance measurement instrument along the measurement direction bearing against the measurement surface, in order to measure the distance between the positioning relief portions along the measurement direction.

2. The molded part according to claim 1, wherein the positioning protrusion is a rib extending over the surface perpendicularly to the measurement direction.

3. The molded part according to claim 1, wherein each positioning relief portion comprises a supporting protrusion, the apex of which defines a supporting surface allowing the positioning of the sensor member simultaneously bearing upon the measurement surface along the measurement direction and upon the supporting surface along a supporting direction perpendicular to the measurement direction.

4. The molded part according to claim 3, wherein the supporting protrusion is a rib extending on the surface of the part along the measurement direction.

5. The molded part according to claim 3, wherein the positioning protrusion and the supporting protrusion are at a distance from each other.

6. The molded part according to claim 1, wherein each positioning relief portion comprises at least one guiding protrusion for limiting the displacement of a sensor member along a transverse direction perpendicular to the measurement direction.

7. The molded part according to claim 6, wherein each positioning relief portion comprises two guiding protrusions intended for receiving the sensor member between them and wherein the guiding protrusions converge towards the positioning protrusion.

8. The molded part according to claim 6, wherein each guiding protrusion is formed by a rib.

9. A molded part in plastic material, the molded part comprising a body having a surface and two positioning relief portions formed on the surface while being spaced apart from each other along a measurement direction, each positioning relief portion having a positioning protrusion defining a measurement surface allowing the positioning of a sensor member of a distance measurement instrument along the measurement direction bearing against the measurement surface, in order to measure the distance between the positioning relief portions along the measurement direction, wherein each positioning relief portion comprises a supporting protrusion, the apex of which defines a supporting surface allowing the positioning of the sensor member simultaneously bearing upon the measurement surface along the measurement direction and upon the supporting surface along a supporting direction perpendicular to the measurement direction, wherein the supporting protrusion has a smaller height than that of the positioning protrusion.

10. A method for dimensionally controlling a molded part in plastic material comprising the steps:
molding the part by forming a body and two positioning relief portions on a surface of the body, the positioning relief portions being spaced apart from each other along a measurement direction, each positioning relief portion having a positioning protrusion defining a measurement surface; and
measuring the distance between both positioning relief portions along the measurement direction by means of a measuring instrument comprising two sensor members, by positioning each sensor member along the measurement direction bearing against the measurement surface of a respective positioning relief portion.

11. The method according to claim 10, wherein the measuring instrument is a vernier caliper comprising two measurement claws.

* * * * *